(12) United States Patent
Weider et al.

(10) Patent No.: US 10,443,368 B2
(45) Date of Patent: Oct. 15, 2019

(54) THERMALLY ACTIVATED STRONG ACIDS

(71) Applicant: SHELL OIL COMPANY, Houston, TX (US)

(72) Inventors: Paul Richard Weider, Houston, TX (US); Robert Lawrence Blackbourn, Houston, TX (US); Ying Zhang, Sugar Land, TX (US); Lee Nicky Morgenthaler, Houston, TX (US); Ryan Matthew Van Zanten, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/667,779

(22) Filed: Aug. 3, 2017

(65) Prior Publication Data

US 2018/0023377 A1 Jan. 25, 2018

Related U.S. Application Data

(63) Continuation of application No. 15/034,619, filed as application No. PCT/US2014/063993 on Nov. 5, 2014, now abandoned.

(60) Provisional application No. 61/901,098, filed on Nov. 7, 2013.

(51) Int. Cl.
| | |
|---|---|
| *E21B 43/25* | (2006.01) |
| *C09K 8/506* | (2006.01) |
| *E21B 43/36* | (2006.01) |
| *C09K 8/516* | (2006.01) |
| *C09K 8/72* | (2006.01) |

(52) U.S. Cl.
CPC .............. *E21B 43/36* (2013.01); *C09K 8/506* (2013.01); *C09K 8/516* (2013.01); *C09K 8/72* (2013.01); *E21B 43/25* (2013.01)

(58) Field of Classification Search
CPC .......... C09K 8/506; C09K 8/516; C09K 8/72; E21B 43/25
See application file for complete search history.

(56) References Cited

U.S. PATENT DOCUMENTS

| | | | |
|---|---|---|---|
| 4,351,955 A | 9/1982 | Willis et al. | |
| 7,703,535 B2 | 4/2010 | Benson | |
| 7,795,186 B2 | 9/2010 | Saini et al. | |
| 7,918,283 B2 | 4/2011 | Balkanyi et al. | |
| 8,057,580 B2 | 11/2011 | Poorte et al. | |
| 8,739,882 B2 | 6/2014 | Sten-Halvorsen et al. | |
| 8,857,519 B2 | 10/2014 | Hale | |
| 9,004,177 B2 | 4/2015 | Hatton | |
| 9,163,482 B2 | 10/2015 | Kanstad et al. | |
| 9,303,498 B2 | 4/2016 | Grimseth et al. | |
| 2005/0034869 A1 | 2/2005 | Appleford et al. | |
| 2005/0279234 A1* | 12/2005 | Inno ...................... B41C 1/1008 101/453 |
| 2009/0042748 A1 | 2/2009 | Fuller | |
| 2010/0032164 A1 | 2/2010 | Bakke | |
| 2011/0155385 A1 | 6/2011 | Haaheim | |
| 2012/0208726 A1 | 8/2012 | Smith et al. | |
| 2013/0269944 A1 | 10/2013 | Reyes et al. | |
| 2014/0069643 A1 | 3/2014 | Ogle et al. | |
| 2014/0187450 A1 | 7/2014 | Mukhopadhyay | |

FOREIGN PATENT DOCUMENTS

| | | |
|---|---|---|
| GB | 2509165 A | 6/2014 |
| WO | 2006092438 A1 | 9/2006 |
| WO | 2014039168 A1 | 3/2014 |

* cited by examiner

*Primary Examiner* — Zakiya W Bates

(57) ABSTRACT

An acid-generating fluid comprising a thermally activated strong acid precursor is provided in the method of the present invention. The thermally activated strong acid precursor comprises sulfur dioxide or a first precursor of a compound adapted to react to liberate sulfur dioxide, and an aldehyde and/or a ketone or a second precursor of a compound adapted to react to liberate an aldehyde and/or ketone. The acid-generating fluid is placed into a subterranean formation, where the first precursor and/or the second precursor are thermally activated, thereby liberating sulfur dioxide and the aldehyde and/or ketone. The sulfur dioxide and the aldehyde and/or ketone are reacted to form a thermally activated strong acid.

14 Claims, 2 Drawing Sheets

THERMALLY ACTIVATED STRONG ACIDS

CROSS-REFERENCE TO RELATED APPLICATIONS

The present application is a Continuation of U.S. application Ser. No. 15/034,619, filed on May 5, 2016, which is a National Stage (§ 371) of International Application No. PCT/US2014/063993, filed Nov. 5, 2014, which claims priority from U.S. Application No. 61/901,098, filed Nov. 7, 2013, the disclosures of each of which are hereby incorporated by reference in their entirety.

BACKGROUND

The present disclosure relates generally to thermally activated strong acids. More specifically, in certain embodiments, the present disclosure relates to compositions capable of generating strong acids downhole and associated methods.

Acid treatments using aqueous acidic solutions commonly are carried out in subterranean formations. These acid simulations may be used to accomplish a number of purposes. Such purposes may include increasing or restoring the permeability of subterranean formations so as to facilitate the flow of oil and gas from the formation into the well. The acid treatments may be used to remove formation damage along as much of the hydrocarbon flow path as possible and/or to create new flow paths as in matrix acidization.

Generally, in acidizing treatments, aqueous acidic solutions are introduced into the wellbore or subterranean formation under pressure so that the acidic solution flows into the wellbore or pore spaces of the formation. Within the wellbore, the acidic solution may also remove wellbore damage and filter cake. Within the near-well formation, the acidic solution may remove near-well formation damage and other damaging substances. In the near-well formation, the acidic solution may react with acid-soluble materials contained in the formation which results in an increase in the size of the pore spaces and an increase in the permeability of the formation. This procedure commonly enhances production by increasing the effective well radius. Examples of such methods are disclosed in U.S. Pat. No. 7,795,186, the entirety of which is hereby incorporated by reference.

Although acidizing a portion of a subterranean formation can be very beneficial in terms of permeability, conventional acidizing systems have significant drawbacks. One major problem associated with conventional acidizing treatment systems is that deeper penetration into the formation is not usually achievable because, inter alia, the acid may be spent before it can deeply penetrate into the subterranean formation. Another problem associated with acidizing subterranean formations is the corrosion caused by the acidic solution to any metal goods (such as tubular goods) in the well bore and the other equipment used to carry out the treatment. For instance, conventional acidizing fluids, such as those that contain organic acids, hydrochloric acid or a mixture of hydrofluoric and hydrochloric acids, have a tendency to corrode tubing, casing, and equipment both on the surface and downhole, especially at elevated temperatures. Another problem is that when acids are pumped into a well, they may cause scale to flake from the upper wellbore and settle and plug the well at a lower level. Another problem associated with conventional acidizing systems is that they can pose handling and/or safety concerns due to the reactivity of the acid.

Various methods of generating a thermally activated acidizing solution based on latent organic acids such as through the use of hydrolysable esters have been previously developed. These methods suffer from the limitations of generating an organic acid, which by their nature, is a weak acid that may only partially disassociate in a solution. This may limit the dissolving power of the solution and preclude the ability to generate silica dissolving acids such as hydrofluoric acid from fluoride salts.

It is desirable to develop a method acidizing a wellbore or a subterranean formation using a solution that generates a strong acid that does not suffer from any of these conventional drawbacks.

SUMMARY

The present disclosure relates generally to thermally activated strong acids. More specifically, in certain embodiments, the present disclosure relates to compositions capable of generating strong acids downhole and associated methods.

In one embodiment the present disclosure provides an acid-generating fluid comprising a thermally activated strong acid precursor.

In another embodiment, the present invention provides a method comprising: providing an acid-generating fluid that comprises a thermally activated strong acid precursor and placing the acid-generating fluid into a subterranean formation.

In another embodiment, the present invention provides a method comprising: providing an acid-generating fluid that comprises a thermally activated strong acid precursor; placing the acid-generating fluid into a subterranean formation; generating a thermally activated strong acid.

The features and advantages of the present disclosure will be readily apparent to those skilled in the art. While numerous changes may be made by those skilled in the art, such changes are within the spirit of the disclosure.

BRIEF DESCRIPTION OF THE DRAWINGS

A more complete and thorough understanding of the present embodiments and advantages thereof may be acquired by referring to the following description taken in conjunction with the accompanying drawings.

DETAILED DESCRIPTION

Figure 1:
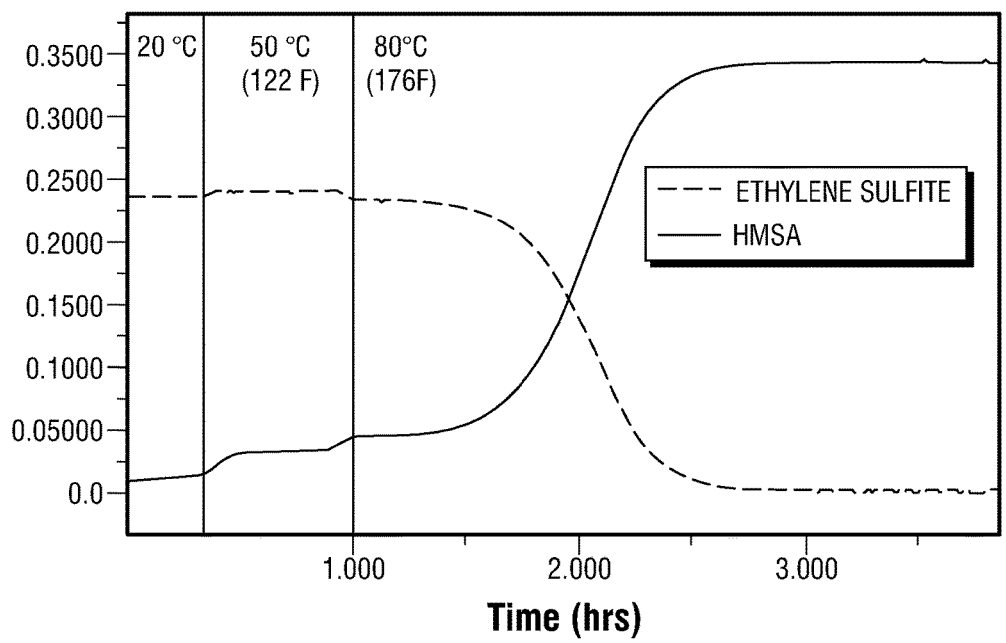
FIG. 1 is a plot of IR optic data showing the concentration of the ethylene sulfite and generated hydroxymethanesulfonic acid.

The description that follows includes exemplary apparatuses, methods, techniques, and/or instruction sequences that embody techniques of the inventive subject matter. However, it is understood that the described embodiments may be practiced without these specific details.

The present disclosure relates generally to thermally activated strong acids. More specifically, in certain embodiments, the present disclosure relates to compositions capable of generating strong acids downhole and associated methods.

Some desirable attributes of the methods discussed herein are that they may be much less corrosive to tubing, casing, and other equipment both on the surface and downhole than conventional systems. Another desirable attribute is that they may not free up deposited scale in the higher reaches of the well systems which can lead to flaking and plugging. Yet another desirable attribute is that they may be capable of achieving deeper penetration into the subterranean formation from the well bore than conventional systems.

In certain embodiments, the present disclosure provides an acid-generating fluid comprising a thermally activated strong acid precursor. As used herein, the term thermally activated strong acid refers to a strong acid that has been generated by heating an essentially pH neutral aqueous solution containing a thermally activated strong acid precursor from a stable temperature. As used herein, the term strong acid refers to an acid having a having a pH value of less than 1 and/or one that is capable of complete ionization.

In certain embodiments, the thermally activated strong acid precursor may comprise one or more compounds, and/or one or more precursors of such compounds, that react together to form thermally activated strong acids. In certain embodiments, the compounds capable of reacting together to form thermally activated strong acids may be $SO_2$ and/or carbonyls. In certain embodiments, the thermally activated strong acid precursors may comprise $SO_2$ precursors (or $SO_2$) and/or organic carbonyl precursors (or organic carbonyls).

Examples of suitable $SO_2$ precursors include sulfones and sulfites. Examples of suitable sulfones include sulfone adducts of butadiene, sulfone adducts of piperylene, and sulfone adducts of isoprene. Examples of suitable sulfites include sulfite esters such as ethylene sulfite, dimethyl sulfite, diethyl sulfite, 1,2-propylene sulfite, and 1,3-propylene sulfite.

Examples of suitable carbonyl precursors or carbonyls include any carbonyl (or precursor that generates a carbonyl) capable of reacting with $SO_2$ to form an alpha-hydroxy sulfonic acid. In certain embodiments, the carbonyls may comprise from 1 to 7 carbon atoms. Examples of suitable carbonyls (or precursors thereof) include aldehydes, metaldehyde, trioxane, formaldehyde, acetaldehyde, propionaldehyde, n-butyraldehyde, butyraldehyde, glycolaldehyde, glyceraldehyde, glyoxal, benzaldehyde, cyclohexanone, acetone, chloroacetone, paraformaldehyde, polyoxymethylene, and any precursor or combination thereof. Other examples of suitable carbonyls (or precursors thereof) include ketones, acetone, acetal, ketal, cyclic acetals, methyl ethyl ketone, mesityl oxide, methyl i-butyl ketone, and any precursors or combination thereof. In certain embodiments, the carbonyl may include a mixture of ketones and/or aldehydes (or precursors thereof) with or without alcohols that may be converted to ketones and/or aldehydes.

In certain embodiments, the acid generating fluid may have an essentially neutral pH. In certain embodiments, the acid generating fluid may have a pH in the range of from 6.5 to 7.5. In other embodiments, the acid generating fluid may have a pH in the range of from 6 to 8. In other embodiments, the acid generating fluid may have a pH of in the range of from 3 to 9.

In certain embodiments, the thermally activated strong acid precursors may be activated to produce an alpha hydroxy sulfonic acid. In certain embodiments, the thermally activated strong acid precursors may be activated to produce a blend of alpha hydroxyl sulfonic acids. In certain embodiments, the alpha hydroxyl sulfonic acid may be of the general formula:

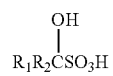

where $R_1$ and $R_2$ are individually hydrogen or hydrocarbyl with up to about 9 carbon atoms that may or may not contain oxygen. In certain embodiments, the alpha hydroxyl sulfonic acid may comprise hydroxy methyl sulfonic acid and/or hydroxyl ethyl sulfonic acid. In certain embodiments, the alpha hydroxyl sulfonic acid, or blend thereof, may have a pH of less than 1. In other embodiments, the alpha hydroxyl sulfonic acid, or blend thereof, may a pH of between 1 and 2.

As used herein, the term "activated" refers to the process in which the one or more thermally activated strong acid precursors releases strong acid components and then those strong acid components reacts with another component and water to form a thermally activated strong acid. Additionally, the term activated also refers to the process in which the one or more components of the thermally activated strong acid react with each another and water to form the thermally activated strong acid.

In certain embodiments, the one or more precursors of the components of the thermally activated strong acid may release the components when exposed to a certain temperature. In certain embodiments, the one or more precursors of the components of the thermally activated strong acid may release the components when hydrolyzing in water. For example, trioxane is readily soluble in water and stable at ordinary temperatures, but when warmed to approximately 80° C. this compound hydrolyzes or decomposes to generate formaldehyde. Similarly, when aqueous metaldehyde solutions are warmed they may generate acetaldehyde. If the aqueous solutions contained $SO_2$ or a precursor thereof, the warmed solution may immediately form an alpha hydroxyl sulfonic acid. In certain embodiments, the one or more precursors of the components of the thermally activated strong acid may release the components at room temperature.

In another example, an aqueous solution of ethylene sulfite and formaldehyde, which is essentially pH neutral is warmed, the ethylene sulfite may hydrolyze with water present to make $SO_2$ and ethylene glycol, and $SO_2$ and formaldehyde may combine with water to make alpha hydroxyl methane sulfonic acid.

In certain embodiments, the thermally activated strong acid precursor may comprise a sulfone adduct of butadiene and/or an aldehyde. In certain embodiments, the amount of sulfolene adduct of butadiene present in the acid-generating fluid may be an amount sufficient to generate a strong acid in the fluid with a concentration of from 0.05% to 20%, from 0.1% to 10%, or from 0.5% to 5% by weight of the acid-generating fluid. In certain embodiments, the amount of aldehyde present in the acid-generating fluid may be an amount sufficient to generate a strong acid in the fluid at a concentration of from 0.05% to 20%, from 0.1% to 10%, or from 0.5% to 5% by weight of the acid-generating fluid. In certain embodiments, the ratio of sulfolene adduct of butadiene to aldehyde present in the acid-generating fluid may be from 10:1 to 1:10.

In certain embodiments, for example when thermally activated strong acid precursors comprises a sulfone adduct, the acid-generating fluid may comprise a dieneophile. The dieneophile may be capable of reacting with a generated diene from the sulfone adduct to from a Diels-Alder adduct. Prudent selection of the dieneophile may result in a di-acid chelating agent. Examples of such suitable dieneophiles include dimethylmaleate. In certain embodiments, the amount of dieneophile present in the acid-generating fluid may be in the range of from fractional to excess molar amounts to the amount of the sulfone adduct employed. In certain embodiments, the dieneophile may be present in an equal molar concentration of the sulfone adduct.

In certain embodiments, the thermally activated strong acid may comprise a sulfite ester and/or a carbonyl. In certain embodiments, the amount of sulfite ester present in the acid-generating fluid may be an amount sufficient to generate a strong acid in the fluid with a concentration of from 0.05% to 20%, from 0.1% to 10%, or from 0.5% to 5% by weight of the acid-generating fluid. In certain embodiments, the amount of aldehyde present in the acid-generating fluid may be may an amount sufficient to generate a strong acid in the fluid with a concentration of from 0.05% to 20%, from 0.1% to 10%, or from 0.5% to 5% by weight of the acid-generating fluid. In certain embodiments, the ratio of sulfite ester to carbonyl present in the acid-generating fluid may be from 10:1 to 1:10.

In certain embodiments, the acid-generating fluid may comprise a base fluid. Examples of suitable base fluids include water. In certain embodiments, the base fluid may be present in the acid-generating fluid in an amount in the range of from 0.01% to 99% by weight of the acid-generating fluid.

In certain embodiments, the acid-generating fluid may be an emulsion. In certain embodiments, the emulsion may comprise an oil-in-water emulsion or a water-in-oil emulsion. In certain embodiments, the one or more thermally activated strong acid precursors may be in the aqueous portion of the emulsion or the non-aqueous portion of the emulsion. In other embodiments, one thermally activated strong acid precursors may be in the aqueous portion while the other may be in the non-aqueous portion. In other embodiments, the acid-generating fluid may be a homogenous solution.

In certain embodiments, the acid generating fluid may be a component of a fluid loss control pill. In certain embodiments, the fluid loss control pill may the acid generating fluid and a gelling agent.

In certain embodiments, the acid generating fluid may be present in the fluid loss control pill in an amount in the range of from 0.01% to 99% by weight of the fluid loss control pill. In certain embodiments, the amount of acid generating fluid present in the fluid loss control pill may be an amount sufficient to generate enough alpha hydroxyl sulfonic acid to completely break the fluid loss control pill once activated.

In certain embodiments, the gelling agent may comprise any gelling agent discussed in U.S. Pat. No. 7,795,186, the entirety of which is hereby incorporated by reference. In certain embodiments, the gelling agent may be present in the fluid loss control pill in an amount sufficient to form a gel with the acid generating fluid. In certain embodiments, the fluid loss control pill may be a homogenous mixture.

In certain embodiments, the present invention provides a method comprising: providing an acid-generating fluid that comprises a thermally activated strong acid precursor and placing the acid-generating fluid into a subterranean formation.

In certain embodiments, the acid-generating fluid may be placed into the subterranean by any conventional means. Examples of suitable subterranean formations include any subterranean formation with a temperature high enough to activate the thermally activated strong acid. In certain embodiments, the subterranean formation temperature may be at room temperature or above 40° C., above 50° C., above 60° C., above 70° C., above 80° C., above 90° C., above 100° C., above 110° C., or above 120° C. Examples of conventional means include introducing the acid-generating fluid as a fluid, an emulsion, or a pill. In certain embodiments, one or more thermally activated strong acid precursors may be present in the subterranean formation before the acid-generating fluid is placed into the subterranean formation. In certain embodiments, water may be present in the subterranean formation before the acid-generating fluid is placed into the subterranean formation.

In certain embodiments, the method may further comprise generating a thermally activated strong acid. In certain embodiments, generating a thermally activated strong acid may comprise activating the thermally activated strong acid precursors to form the thermally activated strong acid.

In certain embodiments, a thermally activated strong acid precursor present in the acid-generating fluid may react with a thermally activated strong acid precursor previously in the subterranean formation and water to form the thermally activated strong acid. In certain embodiments, the thermally activated strong acid precursor present in the acid-generating fluid may release a component of the thermally activated strong acid due to the temperature in the subterranean formation. For example, when an acid-generating fluid comprising an $SO_2$ precursor such as a sulfone or sulfite and a carbonyl is introduced into a subterranean formation at a temperature above 80° C., the $SO_2$ precursor may release the $SO_2$ and the $SO_2$ may react with the carbonyl to form an alpha hydroxy sulfonic acid. Alternatively, when an acid-generating fluid comprising a carbonyl precursor and $SO_2$ is introduced into a subterranean formation containing at a temperature above 80° C., the carbonyl precursor may release the carbonyl and the carbonyl may react with the $SO_2$ form an alpha hydroxy sulfonic acid.

In certain embodiments, two thermally activated strong acid precursors present in the acid-generating fluid may release components of the thermally activated strong acid and those components may then react with each other and water in the subterranean formation to form the thermally activated strong acid. In certain embodiments, the two thermally activated strong acid precursors present in the acid-generating fluid may release a component of the thermally activated strong acid due to the temperature in the subterranean formation. For example, when an acid-generating fluid comprising an $SO_2$ precursor such as a sulfone or sulfite and a carbonyl precursor is introduced into a subterranean formation at a temperature above 80° C., the $SO_2$ precursor may release the $SO_2$, the carbonyl precursors may release the carbonyl, and the $SO_2$ may react with the carbonyl to form an alpha hydroxy sulfonic acid.

In embodiments, where the acid-generating fluid comprises a sulfone addict of butadiene, the sulfone addict of butadiene may release butadiene when activated. In such embodiments, a dienophile present in the acid-generating fluid or the subterranean formation may react with butadiene to form a diacid. In certain embodiments, where the acid-generating fluid comprises a sulfite ester, an alcohol such as ethylene glycol may be released when the sulfite ester is activated.

In certain embodiments, the formation of the thermally activated strong acid may be an autocatalytic reaction. In certain embodiments, calcium carbonate or other base, such as KOH, NaOH, NH$_4$OH, may be added to the reaction as part of the acid-generating fluid or be present in the subterranean formation to slow the reaction. In certain embodiments, the base may be present in the acid-generating fluid in an amount in the range of from 0% to 5% by weight of the acid-generating fluid.

In certain embodiments, the acid-generating fluid may be placed into the subterranean as part as a fluid loss control pill. In certain embodiments, the acid-generating fluid may be allowed to break the fluid loss control pill after being introduced into the subterranean formation.

To facilitate a better understanding of the present invention, the following examples of certain aspects of some embodiments are given. In no way should the following examples be read to limit, or define, the scope of the invention.

EXAMPLES

Example 1—Ethylene Sulfite and Formalin

At room temperature, 15.01 grams of ethylene sulfite (Sigma-Aldrich lot# BCBB370V) and 11.55 grams of formalin (Sigma-Aldrich, ACS Reagent, 37% w in water 10-15% wt. methanol as stabilizer, Lot# SHBB0285) were add to 129.95 grams of water and stirred to produce a homogenous, clear solution. This solution was loaded into a 300 ml autoclave fitted with IR optics. Stirring at 750 rpm was initiated. The mixture was held at ambient conditions (~20 C) for about 20 minutes with no obvious sign of sulfite hydrolysis or HMSA production. The reactor was then heated to 50° C. over 6 minutes and then held at temperature for 30 minutes with no obvious sign of sulfite hydrolysis or HMSA production. The mixture was heated to 80° C. over 5 minutes. After approximately 15 minutes at 80° C. the ethylene sulfite began to significantly react away and HMSA started to be produced. The reactions were seen to be complete approximately 2 hours after reaching 80° C. The reactor was cooled and the run terminated after about 4 total hours from the start of the run. The reactor contents were sampled and $^1$H NMR confirmed that 15.6 g of HMSA was produced (10% w) during the course of the reaction and that all of the ethylene sulfite and aldehyde that were initially charged had been consumed. A mole of ethylene glycol was also made for each mole of ethylene sulfite hydrolyzed. A plot of the IR optic data showing the concentration of the ethylene sulfite and generated hydroxymethanesulfonic acid are shown in FIG. 1. As can be seen in FIG. 1, the generation of acid looks to be an autocatalytic reaction by the shape of the curve. Note that the shifts in baseline absorbance between temperatures are uncorrected in the graphs. They are caused by a combination of IR crystal refractive index changes and solution molarity changes, which are both temperature dependent.

Example 2—Dimethyl Sulfite and Formalin and CaCO$_3$

Figure 2:
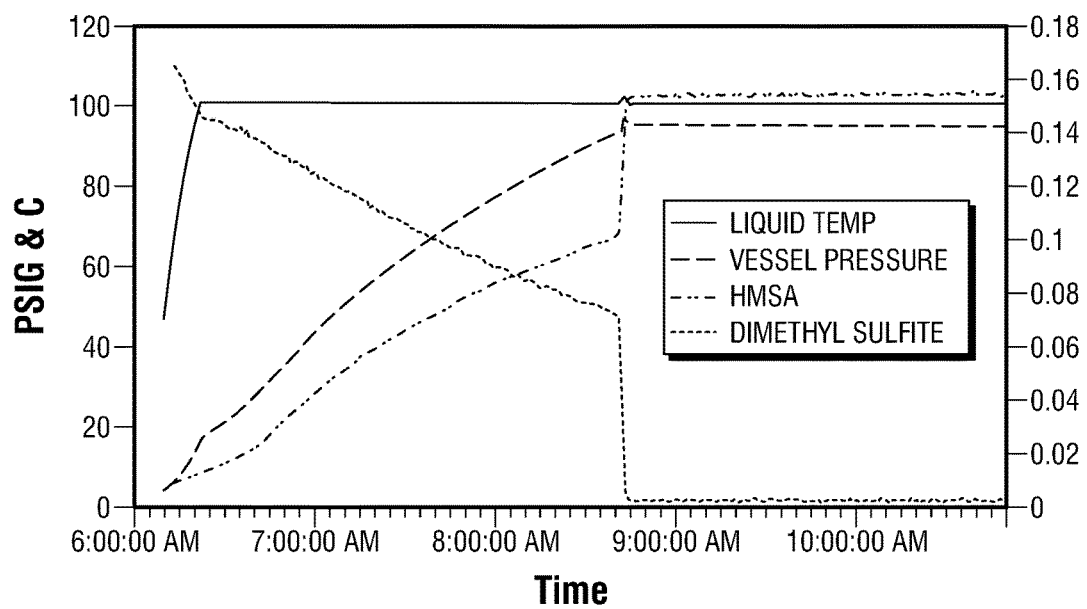
FIG. 2 is a plot of IR optic data showing the concentration of the ethylene sulfite and generated hydroxymethane sulfonic acid.

At room temperature, 15.03 grams of dimethyl sulfite (Sigma-Aldrich Lot# MKBJ9974V), 11.58 grams of formalin (Sigma-Aldrich, ACS Reagent, 37% wt. in water 10-15% wt. methanol as stabilizer, Lot# SHBB0285), and 3.50 grams of CaCO$_3$ were add to 130.12 grams of water and stirred to produce a slurry. This slurry solution was loaded into a 300 ml autoclave fitted with IR optics. The mixture was directly heated to 100° C. and held there for 267 minutes at which point the reaction was terminated. The reactor contents were sampled after cooling. The reactor contents were found to be a clear colorless solution. $^1$H NMR confirmed that HMSA/HMSA salt was produced during the course of the reaction with >96% of theoretical anion recovered. All of the dimethyl sulfite and aldehyde had been consumed during the course of the reaction, along with the initially insoluble CaCO$_3$. A plot of the IR optic data showing the concentration of the ethylene sulfite and generated hydroxymethane sulfonic acid (or the Ca$^{2+}$ salt of the acid as they both have the same IR signature) are shown in FIG. 2. As can be seen in FIG. 2, the generation of acid is slow until the CaCO$_3$ is consumed at which point the reaction turns into an autocatalytic reaction. Note that the shifts in baseline absorbance during the temperature ramp from ambient to 100° C. is uncorrected in the graphs. The main change is caused by a combination of IR crystal refractive index changes and solution molarity changes, which are both temperature dependent.

Example 3—1,3,5-Trioxane and 3-sulfolene

Figure 3:
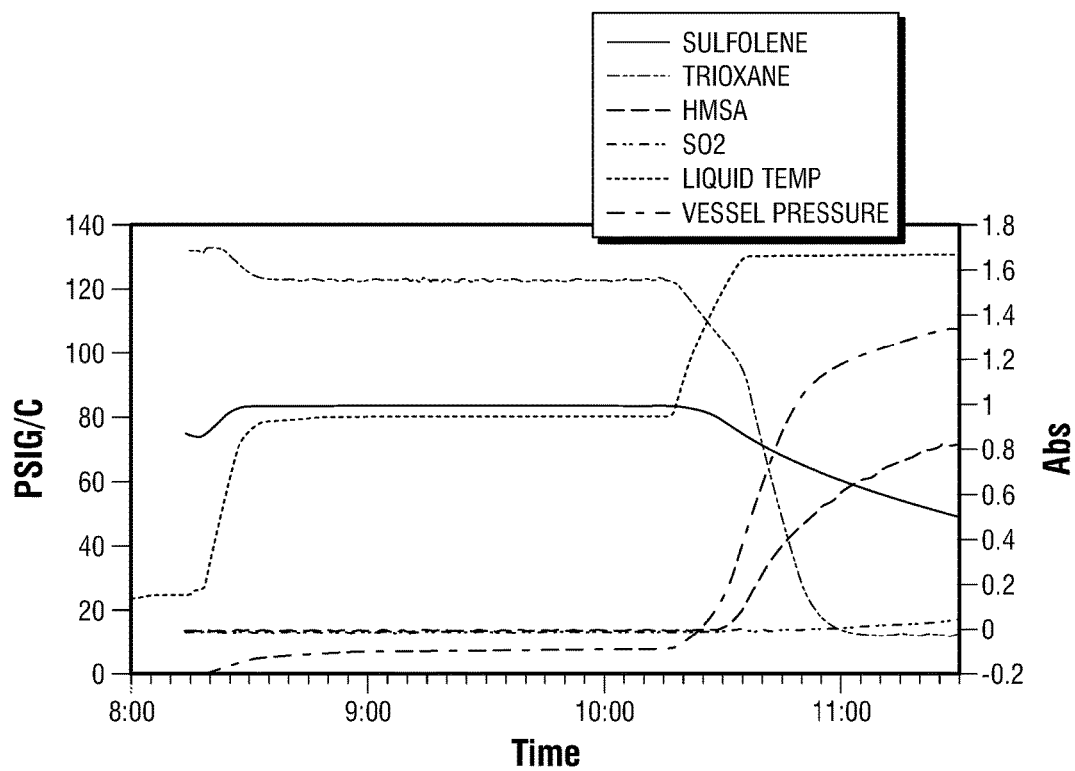
FIG. 3 is a plot showing the results of IR optic data.

At room temperature, 4.82 grams of trioxane and 20.0 grams of 3-sulfolene were added to 155 grams of water and stirred to produce a homogenous, near clear solution. This solution was loaded into a 300 ml autoclave fitted with IR optics. The mixture was heated to 80° C. and held there for 90 minutes with no changes in the in situ IR spectra. The mixture was then heated from 80° C. to 130° C. and then held there. The results of the IR optic data showing the absorbencies of the components are shown in FIG. 3. As can be seen in FIG. 3, no acid was observed to be generated at 80° C. As indicated by a drop in the absorbance of trioxane, this trimer began to decompose to formaldehyde at about 105° C. The 3-sulfolene slowly began to decompose at above 100° C. to SO$_2$ and butadiene. The IR bands of hydroxymethane sulfonic acid increase at temperatures above 100° C., indicating formation.

Example 4—SO$_2$ and Trioxane

Figure 4:
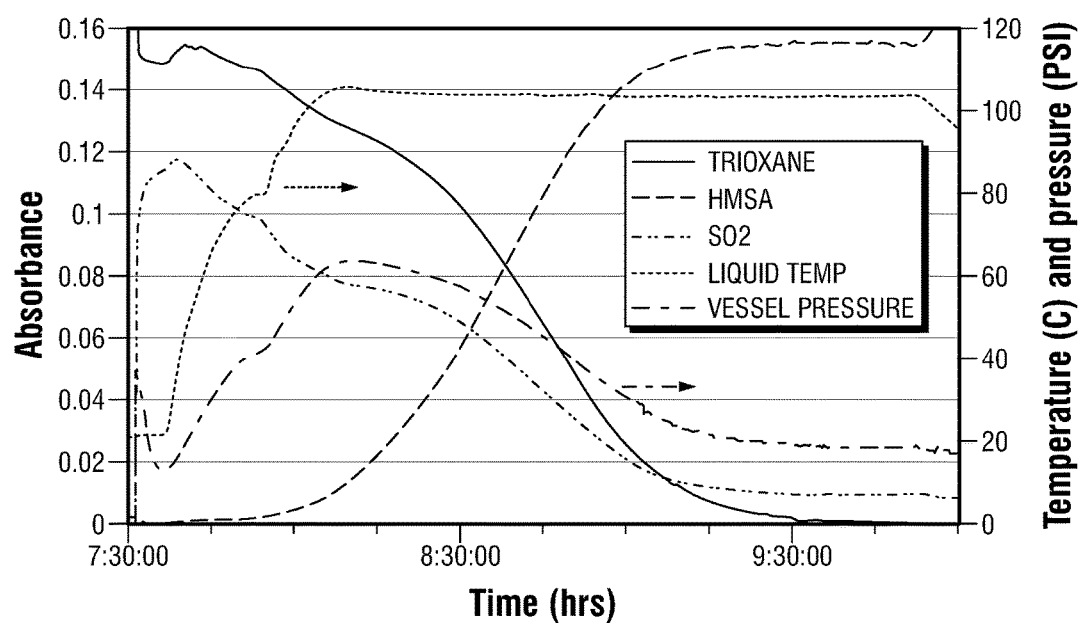
FIG. 4 is plot of IR optic data showing the concentration of the $SO_2$, trioxane, and generated hydroxymethanesulfonic acid.

At room temperature into a 600 ml Parr Autoclave fitted with in situ IR optics was loaded a solution of 7.29 grams trioxane and 250 ml of water. The reactor was sealed and 15.5 grams of SO$_2$ was added via blow case injector. The solution was heated to 50° C. and no change was observed in the infrared spectra with IR bands of all major components remaining unchanged. The solution was then heated to 80° C., again no change was observed. The solution was then heated to 100° C. without any observed change. The solution was then heated to 130° C. and the formation of hydroxyl methane sulfonic acid was observed. A plot of the IR optic data showing the concentration of the SO$_2$, trioxane, and generated hydroxymethanesulfonic acid are shown in FIG. 4.

Example 5—Pill Breaking

A first, second, and third fluid loss pill containing the strong acid generating internal breaker components and a corresponding blank containing no strong acid internal breaker components were manufactured from the same batch of materials. First, 96.0 g of gelling agent (WG-33, Halliburton) and 80 ml of propylene glycol were added to approximately 1800 ml of 14.3 pound per gallon calcium bromide brine (TETRA Technologies, Inc.) in a high speed blender (VitaMix Professional Series 750). The mixture was stirred for 2-3 minutes prior to adding 10 ml of 37% wt.

hydrochloric acid and then stirred for an additional fifteen to thirty minutes. The mixture was then split into three portions with 1564.5 g for internal breaker addition, 1564.5 g for internal breaker addition, and the remaining non cross-linked pill as a retained sample. For the internal breaker sample, 43.37 g of 3-sulfolene (Aldrich, 98% lot # MKBN9972V), and 11.15 g of paraformaldehyde (Sigma-Aldrich, lot #090M1738V) were added and mixed until homogeneous. The pill was completed by adding 3.6084 g of cross-linking agent (CL-30, Halliburton) slurried in 10 ml of water. This was blended until the vortex closes. For the blank sample, no internal breaker was added and the same procedure was followed. The two pills were then distributed for testing using different temperatures.

The first fluid loss pill containing the strong acid generating internal breaker and a corresponding blank was heated to 60° C. The second fluid loss pill containing the strong acid generating internal breaker and corresponding blank was heated to 85° C. The third fluid loss pill containing the strong acid generating internal breaker and corresponding blank was heated to 110° C. It was observed that the third fluid loss pill containing the strong acid generating internal breaker was completely broken to a free flowing liquid in three hours. It was also observed that the second fluid loss pill containing the strong acid generating internal breaker was completely broken to a free flowing liquid between 24 and 48 hours. It was also observed that the first fluid loss pill containing the strong acid generating internal breaker remained an unbroken gelatinous mass after 114 hours. The three corresponding blanks at the three given temperatures also remained unbroken gelatinous masses after 114 hours.

Example 6—Pill Breaking Under Ambient Conditions 24.55 g of gelling agent (WG-33, Halliburton) was mixed with 20 ml of propylene glycol and added to approximately 450 ml of 14.3 pound per gallon calcium bromide brine (TETRA Technologies, Inc.) in a high speed blender (Vita-Mix Professional Series 750). The mixture was stirred for 2-3 minutes prior to adding 2.5 ml of 37% w hydrochloric acid and stirred for an additional fifteen to thirty minutes. 2.03 g of sodium hydroxide dissolved in 2.79 g of water was added in two aliquots and stirred until homogeneous to increase the material pH (~3-4 range as measure by pH paper) prior to the addition of 50.4 g of ethylene sulfite (Beta Pharma Scientific, Lot # E130702) and 13.99 g of paraformaldehyde (Sigma-Aldrich, lot #090M1738V). It should be noted that if the pH is not increased, the ethylene sulfite (or other sulfites tested) will begin to react immediately and the pill will not cross-linked effectively. The pill was completed by adding 1.8 g of cross-linking agent (CL-30, Halliburton) slurried in 10 ml of water. This was blended until the vortex closed.

The fluid loss pill with strong acid generating internal breaker components was then allowed to sit at ambient conditions (~23° C.) overnight. It was observed that the fluid loss pill containing the strong acid generating internal breaker was completely broken to a free flowing liquid in less than 21 hours.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   providing an acid-generating fluid that comprises water and a thermally activated strong acid precursor, the thermally activated strong acid precursor comprising
   a first precursor of a compound adapted to react to liberate sulfur dioxide, and
   a second precursor of a compound adapted to react to liberate a component selected from aldehydes, ketones, and combinations thereof;
   placing the acid-generating fluid into a subterranean formation;
   thermally activating the first precursor and the second precursor, thereby liberating sulfur dioxide and the component selected from aldehydes, ketones, and combinations thereof; and
   reacting the sulfur dioxide and the component selected from aldehydes, ketones, and combinations thereof to form a thermally activated strong acid.

2. The method of claim 1, wherein the first precursor is selected from the group consisting of a sulfone adduct of butadiene, a sulfone adduct of piperylene, a sulfone adduct of isoprene, a sulfite ester, and combinations thereof.

3. The method of claim 1, wherein the first precursor is selected from the group consisting of ethylene sulfite, dimethyl sulfite and combinations thereof.

4. The method of claim 1, wherein the second precursor is selected from the group consisting of paraformaldehyde, polyoxymethylene, metaldehyde, trioxane, formaldehyde, acetaldehyde, and combinations thereof.

5. The method of claim 1, wherein the first and second precursors are provided in a ratio of 1:1.

6. The method of claim 1, wherein the first and second precursors are provided in an amount sufficient to generate a strong acid at a concentration of from 0.1% to 10% by weight of the acid-generating fluid.

7. The method of claim 1, wherein the thermally activated strong acid precursor comprises an $SO_2$ precursor and an aldehyde or ketone precursor in an amount sufficient to generate a strong acid at a concentration of from 1% to 5% by weight of the acid-generating fluid.

8. The method of claim 1, wherein the acid-generating fluid further comprises a dienophile.

9. The method of claim 8, wherein the dieneophile and the thermally activated strong acid precursor are provided in a 1:1 molar ratio.

10. The method of claim 1, wherein the acid-generating fluid further comprises a base.

11. The method of claim 10, wherein the base is CaCO3.

12. The method of claim 1, wherein the acid-generating fluid is an emulsion.

13. The method of claim 1, wherein the acid-generating fluid has a pH of greater than 4.

14. The method of claim 1, wherein the acid generating fluid is a component of a fluid loss control pill.

* * * * *